(12) United States Patent
Yoon et al.

(10) Patent No.: US 9,376,076 B2
(45) Date of Patent: Jun. 28, 2016

(54) METHOD AND APPARATUS FOR DEPLOYMENT OF AN AIR BAG

(75) Inventors: Joseph Y. Yoon, Rochester Hills, MI (US); David R. Little, Kokomo, IN (US)

(73) Assignee: Joseph Y. Yoon, Oakland Township, MI (US)

( * ) Notice: Subject to any disclaimer, the term of this patent is extended or adjusted under 35 U.S.C. 154(b) by 0 days.

(21) Appl. No.: 09/949,702

(22) Filed: Sep. 10, 2001

(65) Prior Publication Data

US 2002/0056975 A1    May 16, 2002

Related U.S. Application Data

(60) Provisional application No. 60/248,997, filed on Nov. 15, 2000.

(51) Int. Cl.
| | |
|---|---|
| *B60R 21/013* | (2006.01) |
| *B60R 21/203* | (2006.01) |
| *B60R 22/18* | (2006.01) |

(Continued)

(52) U.S. Cl.
CPC ......... *B60R 21/013* (2013.01); *B60R 21/01546* (2014.10); *B60R 21/01556* (2014.10); *B60R 21/203* (2013.01); *B60R 21/2644* (2013.01); *B60R 22/18* (2013.01); *B60R 21/0155* (2014.10); *B60R 2021/2633* (2013.01)

(58) Field of Classification Search
CPC ............ B60R 21/013; B60R 21/01546; B60R 21/01556; B60R 21/2644; B60R 21/203; B60R 22/18; B60R 21/0155; B60R 2021/2633
USPC .................. 280/735, 736, 741; 180/268, 273; 701/45
See application file for complete search history.

(56) References Cited

U.S. PATENT DOCUMENTS

| | | | | |
|---|---|---|---|---|
| 4,243,248 A | * | 1/1981 | Scholz et al. .................. | 280/735 |
| 5,219,178 A | * | 6/1993 | Kobari et al. ................. | 280/736 |

(Continued)

FOREIGN PATENT DOCUMENTS

JP           11-286256      * 10/1999

*Primary Examiner* — Drew Brown
(74) *Attorney, Agent, or Firm* — Young Basile Hanlon & MacFarlane P.C.

(57) ABSTRACT

A method and apparatus for controlling the deployment of a passive inflatable restraint system wherein driver and passenger air bags are employed each having two independently actuatable gas generators of the same or different sizes which are activated in a fixed time sequence. The sequence is timed to provide an initial low inflation rate to just open the airbag container and initially deploy the airbag followed by a higher gas flow rate to complete filling of the cushion. An electronic control unit containing a control algorithm and connected to external sensors monitors vehicle decelerations, detects impacts, and determines if impact severity warrants deployment of an airbag for occupant protection. The external sensors include one or more sensors located in the forward portion of the vehicle to provide early impact detection and crash severity indications; a weight based occupant detection system located in the passenger seat to identify infants and small children and provide airbag suppression; and a seat belt mode or seat belt tension sensor to determine the presence of a cinched child seat and provide additional airbag suppression. The control algorithm monitors the above described sensors and if a deployment is required, a signal for activating the first initiator and a second signal for activating the second initiator are provided, the second signal being delayed a predetermined time after the first signal is generated.

14 Claims, 16 Drawing Sheets

(51) Int. Cl.
   *B60R 21/264*   (2006.01)
   *B60R 21/015*   (2006.01)
   *B60R 21/263*   (2011.01)

(56) References Cited

U.S. PATENT DOCUMENTS

| | | | |
|---|---|---|---|
| 5,348,343 A | 9/1994 | Hawthorn | 280/730.1 |
| 5,411,289 A * | 5/1995 | Smith et al. | 280/735 |
| 5,560,648 A | 10/1996 | Rhule et al. | 280/731 |
| 5,605,346 A | 2/1997 | Cheung et al. | 280/728.2 |
| 5,605,350 A | 2/1997 | Bates et al. | 280/743.1 |
| 5,613,702 A | 3/1997 | Goetz | 280/735 |
| 5,630,614 A | 5/1997 | Conlee et al. | 280/730.1 |
| 5,636,862 A | 6/1997 | Cheung et al. | 280/730.2 |
| 5,636,864 A * | 6/1997 | Hori | 280/735 |
| 5,796,177 A * | 8/1998 | Werbelow et al. | 701/45 |
| 5,880,534 A | 3/1999 | Mossi et al. | 307/10.1 |
| 6,007,094 A * | 12/1999 | Hosoda | 280/735 |
| 6,106,010 A | 8/2000 | Forbes et al. | 280/741 |
| 6,139,055 A * | 10/2000 | Dahl et al. | 280/741 |
| 6,199,901 B1 * | 3/2001 | Iizuka | 280/735 |
| 6,199,906 B1 * | 3/2001 | Trevillyan et al. | 280/736 |

* cited by examiner

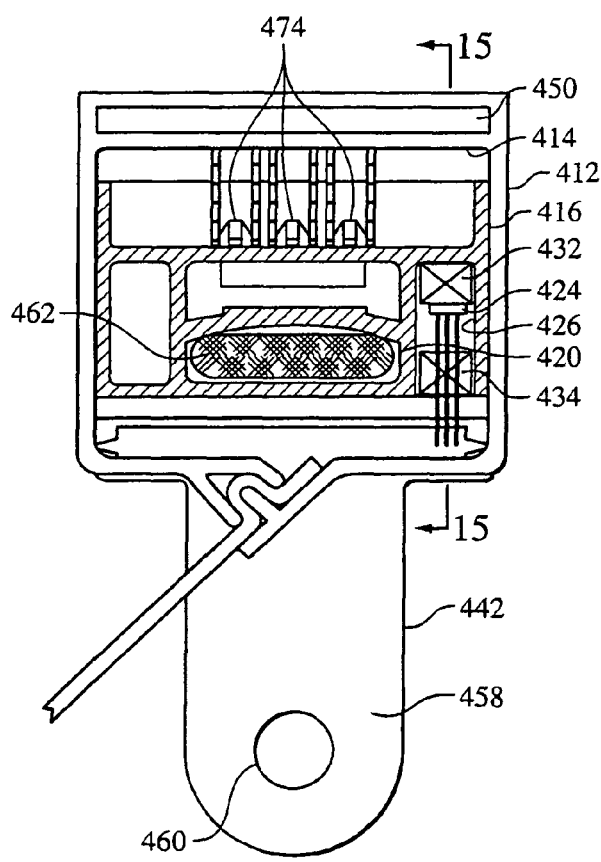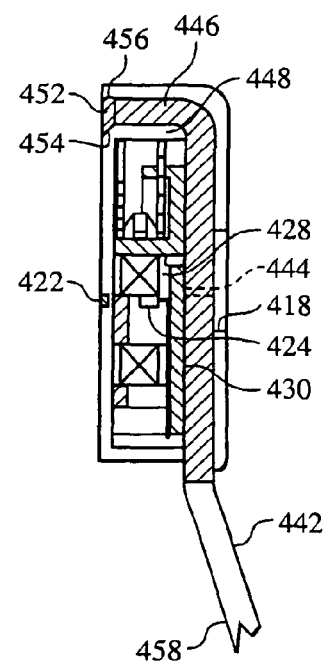
FIGURE 15
FIGURE 14

METHOD AND APPARATUS FOR DEPLOYMENT OF AN AIR BAG

CROSS REFERENCE TO RELATED APPLICATIONS

This application claims the benefit of U.S. Provisional Application Ser. No. 60/248,997 filed Nov. 15, 2000, the contents of which are incorporated herein by reference thereto.

TECHNICAL FIELD

The present invention relates generally to vehicle passive inflatable restraint systems and, more particularly, to an air bag deployment system.

BACKGROUND

Driver side or passenger side passive inflatable restraint (PIR) systems typically include an air bag stored in a housing module within the interior of the vehicle in close proximity to either the driver or one or more passengers. PIR systems are designed to actuate upon sudden deceleration so as to rapidly deploy an air bag to help restrain the movement of the driver or passengers. During deployment, gas is emitted rapidly from an inflator into the air bag to expand it to a fully inflated state.

Air bag passive restraint systems include an inflator, which produces gas to inflate an air bag cushion. There are several types of inflators for air bag modules. One type is the cold gas inflator wherein a pressure vessel contains stored pressurized gas. The pressure vessel communicates with the cushion through various types of rupturable outlets or diaphragms. Another type is the pyrotechnic gas generator wherein a propellant is ignited and the resultant gas flows through an outlet into the cushion. A third type is the hybrid or augmented type. This type includes a pressure vessel containing stored pressurized gas and a pyrotechnic heater. When the heater is ignited, the stored gas from the pressure vessel is heated (expands) resulting in a greater gas volume to the airbag cushion.

All of these inflator types can be configured as dual stage inflators. Using two separate initiators, the cushion can be inflated to a low pressure at a relatively low rate under some deployment conditions; and to a higher pressure at a relatively high rate under other deployment conditions. This can be accomplished, for example, in a hybrid type inflator by providing the pressure vessel with two separately ignitable heaters.

SUMMARY OF THE INVENTION

The invention consists of a restraint system having novel airbag modules, airbag suppression logic using a passive occupant detection system (PODS), seat belt inputs either from an automatic locking retraction (ALR) switch or belt tension sensor (BTS), and deployment logic to appropriately control the airbag deployment and assist in the restraint of an occupant.

Each airbag module contains an inflator having a first and second initiator each being fired during an air bag deployment, with the second initiator being ignited after a predetermined time delay. Each initiator provides gas flow to an air bag which is deployed in a two-step sequence. Both initiators will be fired for any deployment, leaving no live squibs in the air bag module after deployment. The first initiator provides a low inflation rate and contributes an initial volume of gas sufficient to just deploy the airbag cushion. After the cushion has begun to deploy, the second initiator is fired and provides additional gas at a higher inflation rate into the cushion to provide the required restraint capability. The higher gas flow rates are initiated after the cushion has been deployed.

A deployment command consisting of two signals will be transmitted by a sensing and diagnostic module (SDM) to each airbag module when a sufficiently severe vehicle impact occurs as to require airbag deployment. Should the passive occupant detection system (PODS) determine that a small child or a child seat or infant seat is occupying the passenger seat, the deployment command will be suppressed and not sent to the airbag modules. The PODS uses the measured weight of the occupant to make this determination.

Since some child seats require cinched seat belts to retain them in position, a switch detecting the activation of the automatic locking retractor feature or a seat belt tension sensor is employed to correct the PODS weight estimation for the additional load produced by the cinched seat belt. Alternatively, the ALR or BTS switches may be used to suppress the deployment command directly.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which:

FIG. 14 is a cross sectional view of a seat belt tension assembly without tension;

FIG. 15 is a view along lines 15-15 of FIG. 14;

DESCRIPTION OF THE PREFERRED EMBODIMENT

Figure 1:
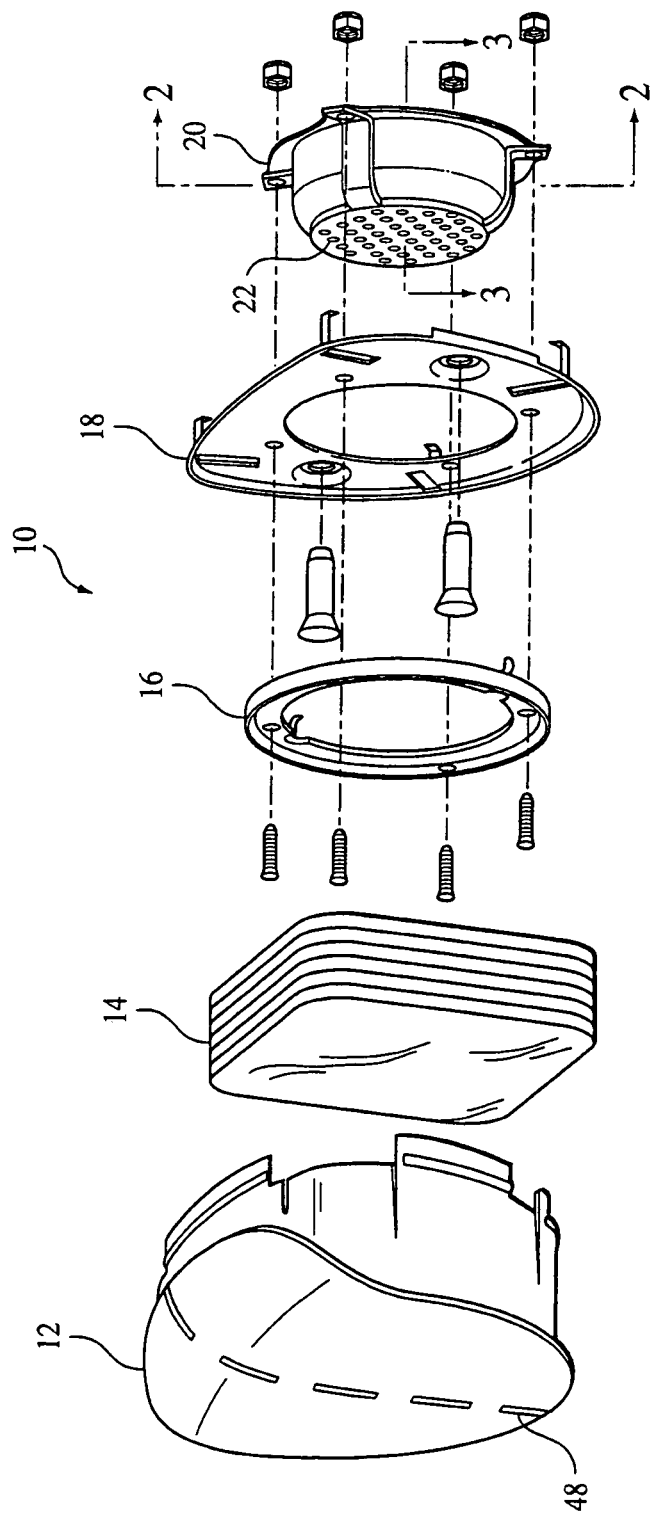
FIG. 1 is an exploded perspective view of a driver side air bag module.

Referring now to FIG. 1, a driver's side air bag module, generally designated at 10 is illustrated. Air bag module 10 includes a cover 12, an air bag cushion 14, a retainer 16, a mounting plate 18, and an inflator assembly 20. The inflator assembly has a plurality of vent apertures 22 which are in fluid communication with an opening (not shown) into the rear of air bag cushion 14. The inflator assembly through apertures 22 releases a volume of gas into the air bag cushion. The volume of gas released into the air bag cushion is sufficient to deploy the air bag cushion through cover 12.

Figure 2:
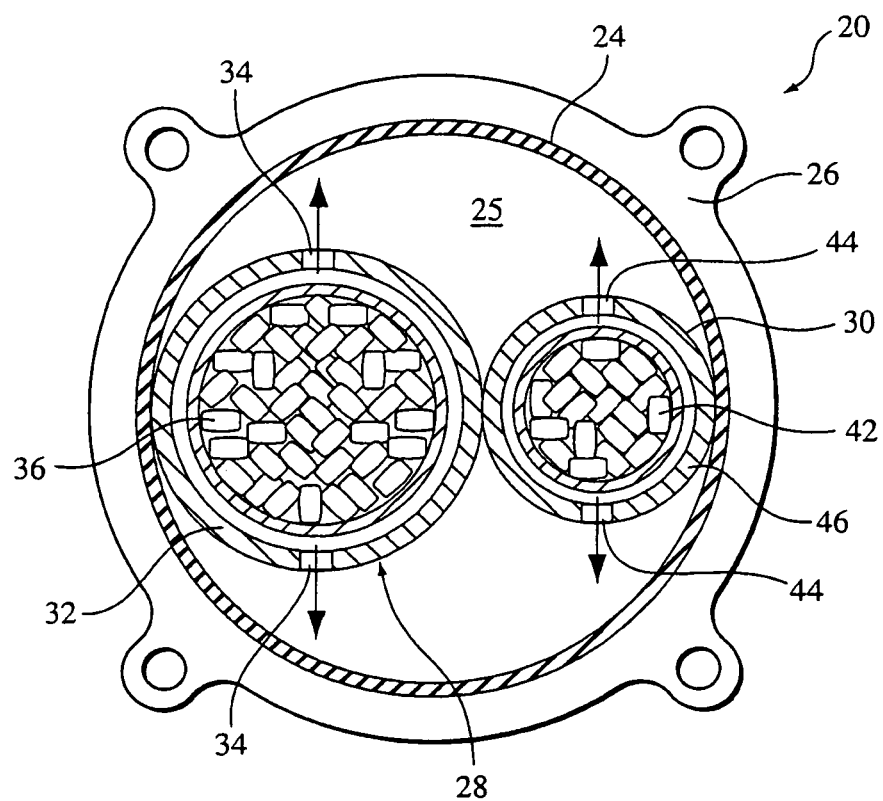
FIG. 2 is a view along lines 2-2 of FIG. 1 and shows a two stage pyrotechnic driver inflator.
Figure 3:
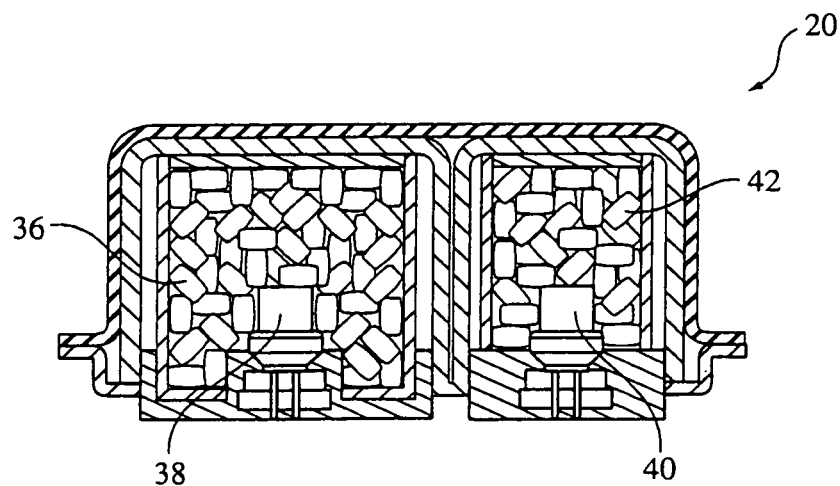
FIG. 3 is a view along lines 3-3 of FIG. 1.

Referring now to FIGS. 2 and 3, inflator assembly 20 has an inflator housing 24 defining an interior inflator housing cavity 25. In addition, inflator assembly 20 has a peripheral flange 26 for mounting inflator assembly 20 to air bag module 10. Positioned within cavity 25 are a first initiator 28 and a second initiator 30. Initiator 28 has an initiator housing 32. Initiator housing 32 has a plurality of vent apertures 34. A propellant 36 is stored within housing 32 of initiator 28. Propellant 36 is ignited by a squib 38 which fires in response to a signal received from a controller in response to signals received from a plurality of sensors positioned throughout the vehicle in order to determine whether deployment of the airbags is required. In an exemplary embodiment, propellant 36 is a pyrotechnic-type solid propellant and alternatives such as pressured gas are also contemplated to be used.

Accordingly, and as the squib ignites the propellant, the resultant gas flows through an outlet pathway to the cushion. In an exemplary embodiment, the gas of initiator 28 flows through vent openings 34 into cavity 25 and into the air bag opening through vent apertures 22.

Similarly, second initiator 30 has a squib 40 for igniting a propellant 42, the resultant gas passes through vent openings 44 in a housing 46 of second initiator 30. In an exemplary embodiment, typically, first initiator 28 is larger than second initiator 30. Accordingly, the resultant gas generated by first initiator 28 is more than the gas generated by second initiator 30.

Figure 4:
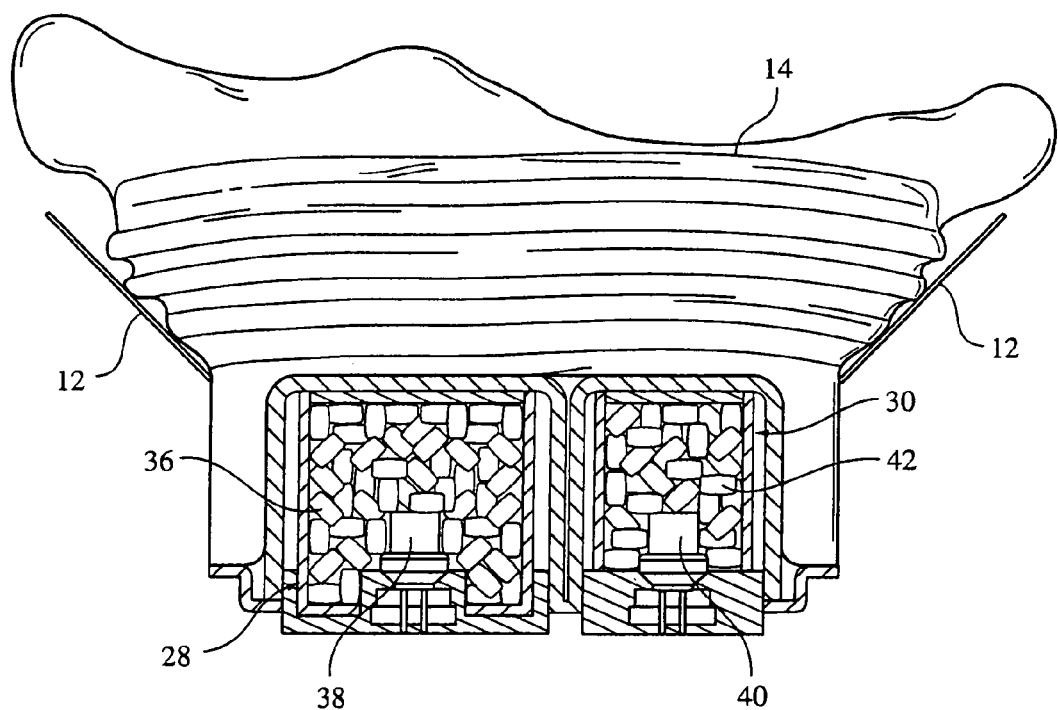
FIG. 4 is a cross-sectional view of a driver airbag module in a first deployment configuration.
Figure 5:
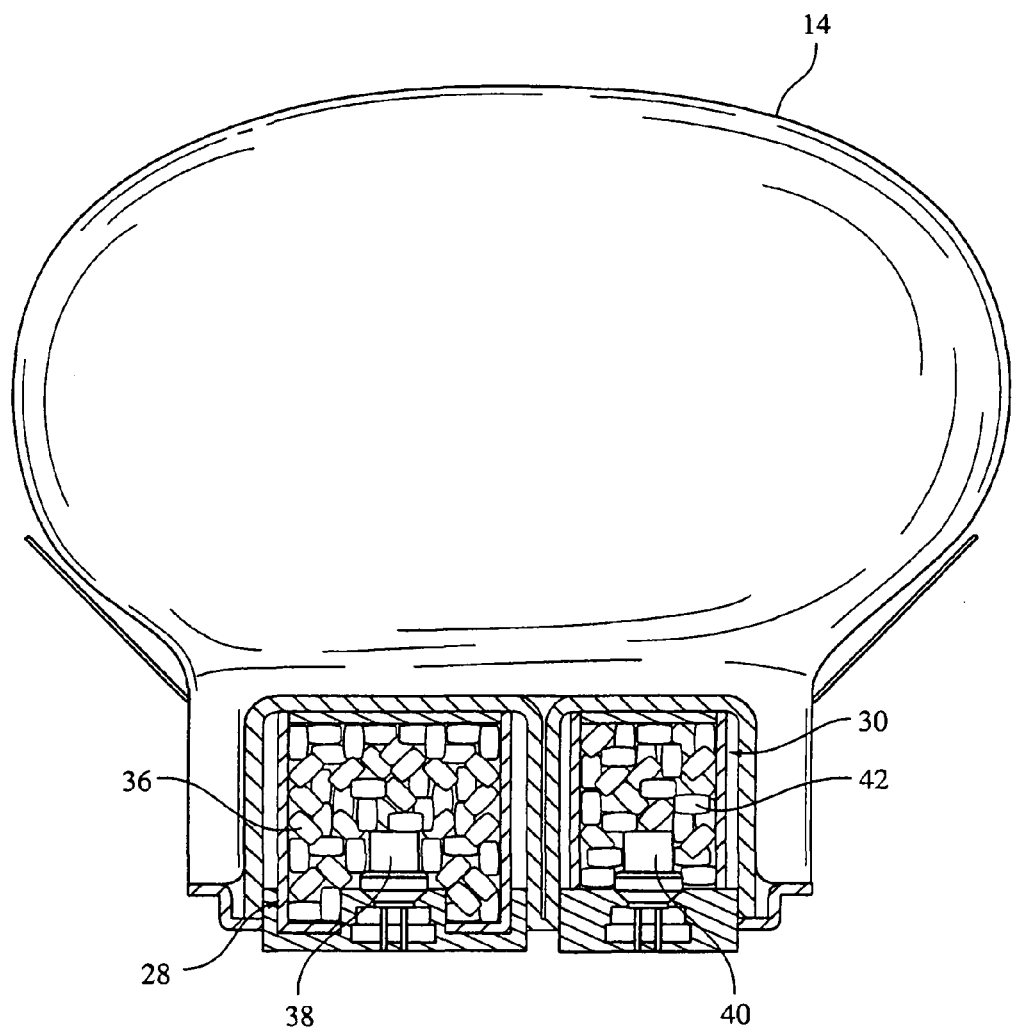
FIG. 5 is a cross-sectional view of a driver airbag module in a second deployment configuration.

In addition, and in accordance with an exemplary embodiment, a preferred mode of the deployment of air bag cushion 14 of air bag module 10 is as follows: first, initiator 28 fires to provide an amount of gas for deploying air bag cushion 14 into a first deployment position (FIG. 4). The amount of gas provided to air bag cushion 14 is sufficient to cause cushion 14 to break through a tear seam 48 of cover 12. Alternatively, and in applications where cover 12 or a portion thereof is dislodgable from module 10 the amount of gas is sufficient to dislodge cover 12. Second, initiator 30 fires to provide a second amount of gas to air bag cushion 14 in order to fully deploy air bag cushion 14 (FIG. 5).

Figure 6:
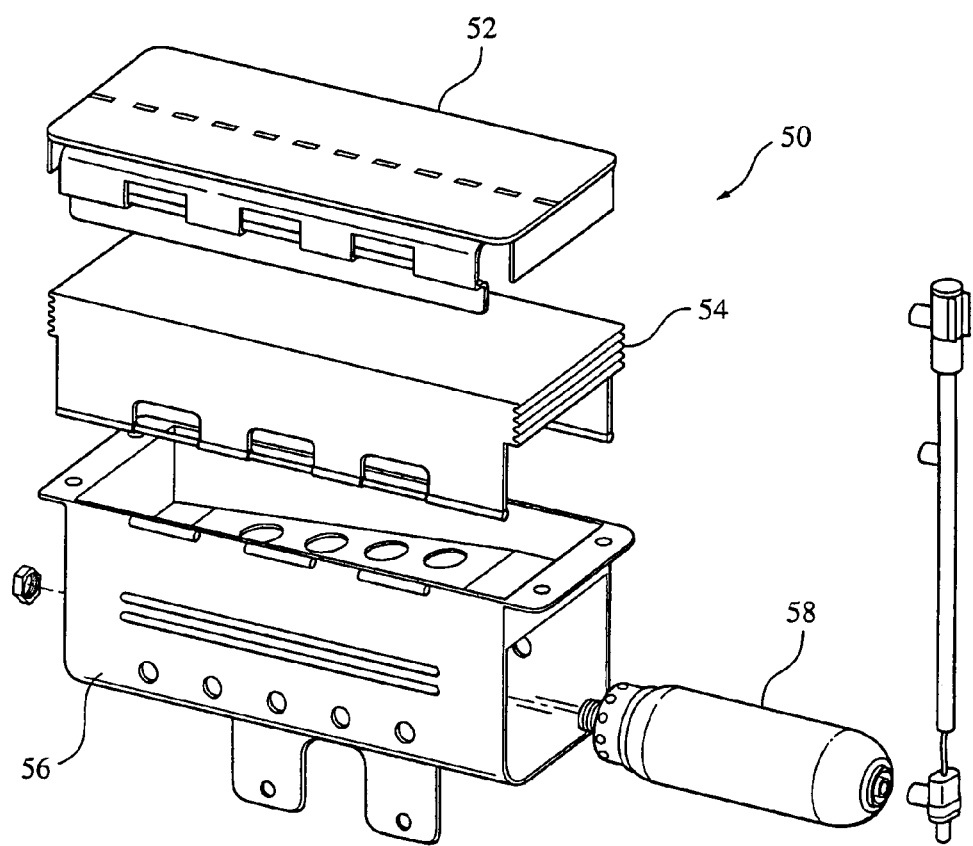
FIG. 6 is an exploded perspective view of a passenger side air bag module.

Referring now to FIG. 6, a passenger side air bag module 50 is illustrated. Air bag module 50 has a cover or door 52, an inflatable air bag cushion 54, a housing assembly 56 and an inflator assembly 58.

Figure 7:
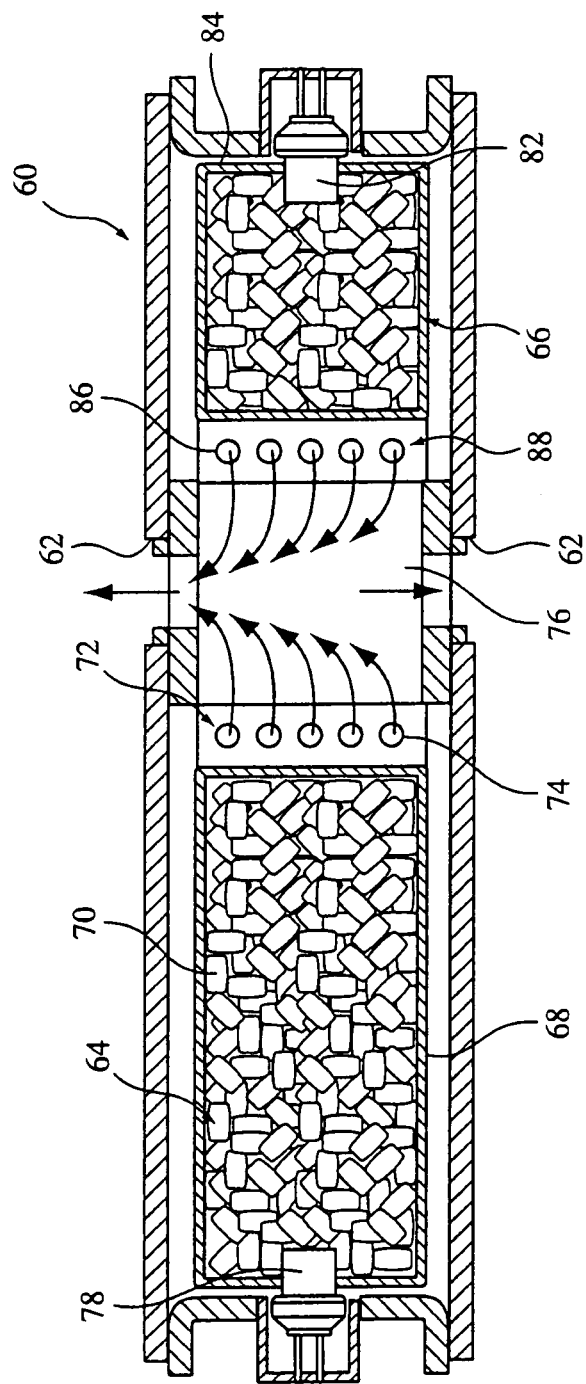
FIG. 7 is a cross-sectional view of a two-stage pyrotechnic passenger side inflator.

Referring now to FIG. 7, an inflator assembly 60 is illustrated. Here inflator assembly 60 has a central opening 62 that once installed into a housing of a passenger side air bag module is in fluid communication with an opening of an inflatable air bag cushion. Inflator assembly 60 has a first initiator 64 and a second initiator 66. First initiator 64 has an outer housing 68 for containing a propellant 70. In addition, first initiator 64 has an exhaust manifold 72 in fluid communication with the propellant of housing 68. Exhaust manifold 72 has a plurality of vent openings 74. Vent openings 74 are in fluid communication with an exhaust plenum 76 that is in fluid communication with central vent opening 62. A first squib 78 provides a means for igniting the propellant in housing 68. In addition, first squib 78 is connected to a central processor or controller which provides a signal to fire first squib 78 in response to a signal or plurality of signals received from a plurality of sensors positioned about the vehicle. The plurality of sensors provide information about the impact severity which in response to adverse conditions sends a signal to authorize first squib 78 to fire.

Second initiator 66 has a squib 82 for igniting a propellant 84 whose gas passes through vent openings 86 in an exhaust manifold 88. The first initiator 64 is larger than second initiator 66. Accordingly, the resultant gas generated by first initiator 64 is larger than the gas generated by second initiator 66.

In addition, and in accordance with an exemplary embodiment, a preferred mode of deployment of air bag cushion 54 of air bag module 50 is similar to the deployment of air bag module 10 in which the first initiator fires first to provide a first amount of gas for deploying the air bag cushion into a first deployment position. The amount of gas provided to the air bag cushion is sufficient enough to cause the cushion to break through a tear line of the air bag cover, and the second initiator fires after a fixed time delay to provide a second amount of gas to the air bag cushion in order to fully deploy the air bag cushion.

Accordingly, the air bag modules with inflators that have two initiators provide deployment by creating a gentler inflation curve (S-curve) with less punch out force in the first stage (first initiator firing) to break the air bag cover tear seam and get the air bag out.

The first ignition will always be followed by a second ignition in a fixed time delay to produce more gas into the cushion resulting in a higher inflation slope when the second initiator is fired. The module uses a sequential deployment of the inflator initiators.

Moreover, there will be no unfired initiator left in the air bag module.

Figure 8:
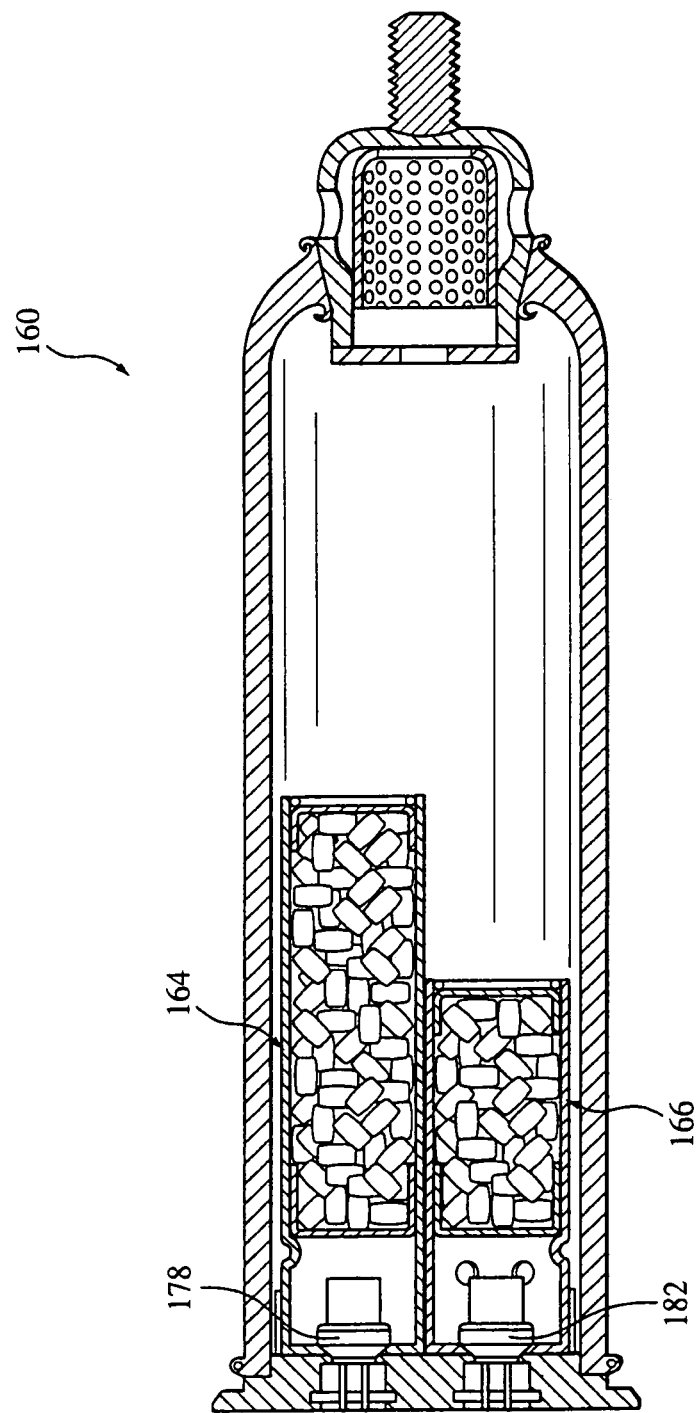
FIG. 8 is a cross-sectional view of a hybrid passenger side inflator.

Referring now to FIG. 8, an alternative configuration of a passenger side inflator assembly is illustrated. Inflator assembly 160 includes first and second initiators 164, 166 with first and second squibs 178, 182.

Figure 9:
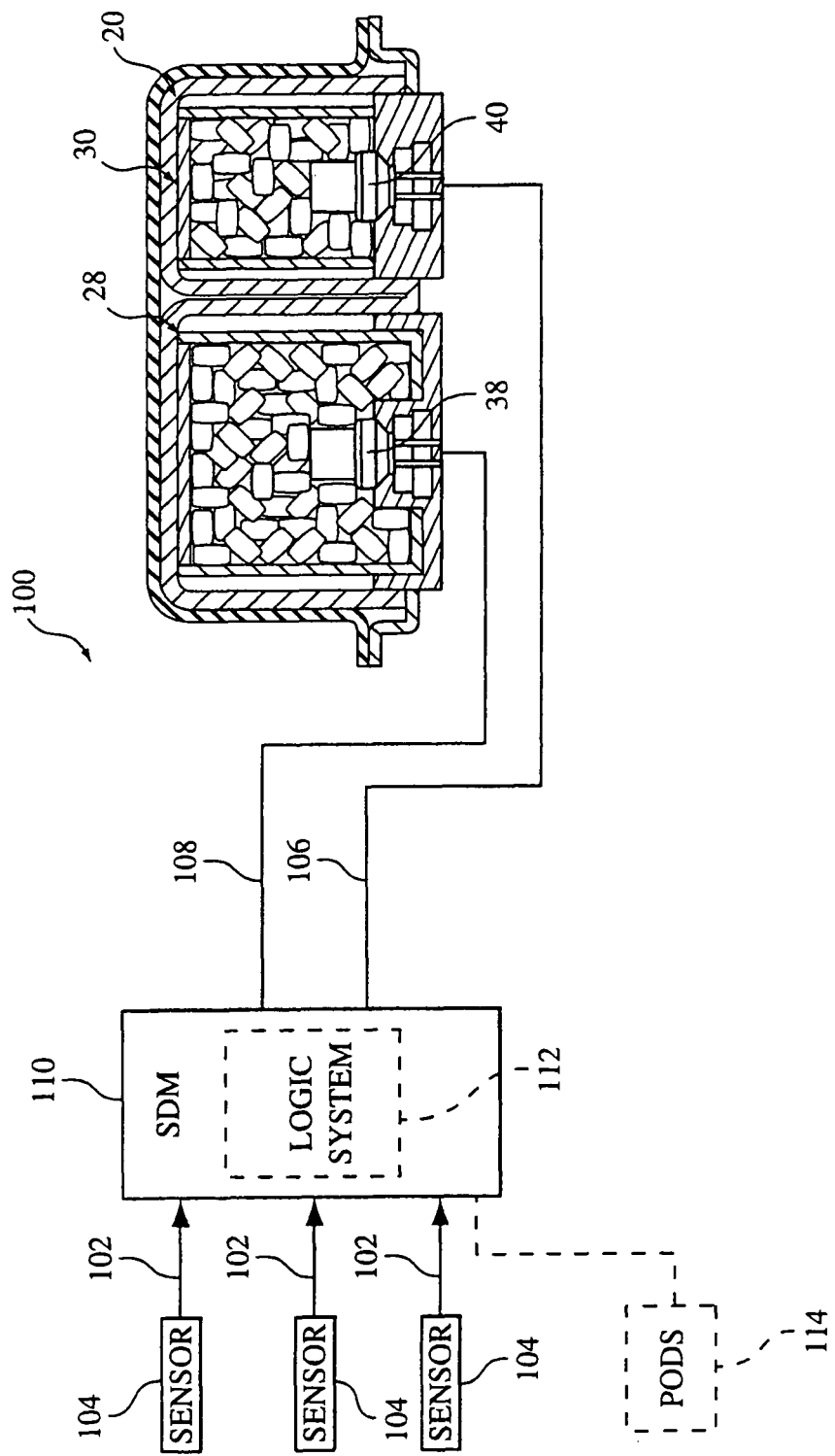
FIG. 9 is a diagrammatic view of a two-stage driver side inflator and control system.

Referring now to FIG. 9, a control system 100 is illustrated. Control system 100 is used in the deployment of an air bag module using an inflator with a pair of initiators with a sequential firing of both initiators in accordance with an exemplary embodiment of the present invention, for example, inflator assembly 20. Of course, other types of inflator assemblies with multiple initiators for air bag deployment are contemplated for use with control system 100. In addition, both passenger side and driver side inflator assemblies are contemplated for use with control system 100.

A sensing and diagnostic module (SDM) 110 receives a plurality of inputs 102 from a plurality of sensors 104 and determines whether an air bag deployment is necessary. If the SDM determines that an air bag deployment is necessary, SDM 110 generates a first signal 108 and a second signal 106. The first signal is received by and instructs a first squib of a first initiator to fire. The second signal is received by and instructs a second squib of a second initiator to fire. For example, squibs (38 and 40) of assembly 20.

In accordance with an exemplary embodiment of the present invention, a time delay is applied to delay the generation of second signal 106. The time delay is generated by a logic system 112 of SDM 110. Accordingly, and as plurality of signals 102 are received within SDM 110 a decision to deploy the air bag is determined. If SDM 110 determines that deployment is necessary second signal 106 is delayed a predetermined amount of time to facilitate the deployment of an air bag in a manner including but not limited to the deployment illustrated in FIGS. 4 and 5.

The SDM receives signals (such as vehicle decelerations and impact sensors) in order to determine whether an air bag should be deployed. One of sensors 104 is an electronic frontal sensor (EFS), which is an external sensor mounted in the engine compartment, typically on the radiator tie bar to supplement the internal sensors of the SDM in detecting and responding in a timely manner to threshold impacts such as the offset deformable barrier impact. In addition, the SDM has its own internal sensors for measuring vehicle decelerations. The EFS will be used to enhance the overall sensing system performance by providing early information to the SDM to determine airbag deployment.

Accordingly, and if the appropriate signals from the sensors located throughout the vehicle are received, a signal for initiating the deployment of an air bag is generated by the SDM.

In an exemplary embodiment, the preferred delay of second signal 106 with respect to first signal 108 is 20 milliseconds. Accordingly, first initiator 28 fires 20 milliseconds before second initiator 30. Of course, and as applications may require, the delay value may be greater than or less than 20 milliseconds.

Preferably, the delay will be in a 5-35 millisecond range, however, and as applications may require, delays outside this range are contemplated to be within the scope of invention.

In addition, it is noted that the system will always fire both squibs and follow a fixed time sequence deployment. The squibs are fired once the SDM has determined that airbag deployment is required. Moreover, this allows low level deployment in the first stage with overall high-level gas discharge from both the first and second stages.

The amount of delay and resultant gas generated by initiators 28 and 30 will depend upon the vehicle performance characteristics as well as the necessary force required to dislodge the cover or door which is placed over the air bag. Accordingly, it is contemplated that these values may differ for applications in multiple types of vehicles.

As an alternative embodiment, and as illustrated by the dashed lines in FIG. 9, a passive occupant detection system (PODS) 114 provides an input into the SDM. PODS 114 is a sensing system installed in the seat cushion which senses the weight of the occupant to determine if infants, small children or an adult are present (in the passenger seat) and if necessary, instructs the SDM to utilize air bag suppression. Thus, the system will suppress the passenger side airbag if the PODS has detected and determined that smaller sized children are in the passenger seating position. Separate from or as part of the PODS, a seat belt mode sensor such as an automatic locking retractor switch (ALR SW), or a belt tension sensor (BTS) may also be provided to detect the installation of a child seat and modify or replace the decision of the PODS system to suppress the airbag.

As yet another alternative, second squib 40 is equipped with a mechanical delay to provide the necessary delay in firing of the second squib. In this embodiment, signals 106 and 108 may be fired at the same time or alternatively a single signal may be sent to one squib and the second squib can be fired by a mechanical delaying mechanism between the two squibs. This will allow the SDM to send a signal to only one squib (e.g., one signal for a driver airbag module and one for a passenger airbag module).

Alternative inflator assemblies may include a hybrid inflator wherein the first initiator is a pyrotechnic device which is used as a heater to expand a gas stored in a pressure vessel. A second initiator is provided to further heat and expand the stored gas. Accordingly, the first initiator is fired first to initially expand the gas and just deploy the airbag cushion, then the second initiator is ignited following a time delay which causes the resultant gas to expand further and completely fill the cushion.

The deployment of the air bag modules as disclosed herein provides a means for deploying an air bag cushion in a manner which causes the air bag module to always fire both initiators leaving no unfired charges in the air bag module after it has deployed.

While only two types of air bag modules are illustrated herein, it is contemplated that in accordance with the present invention the inflators described herein may be used in other air bag modules, including but not limited to, driver side air bag modules, passenger side air bag modules and side impact air bag modules.

Figure 10:
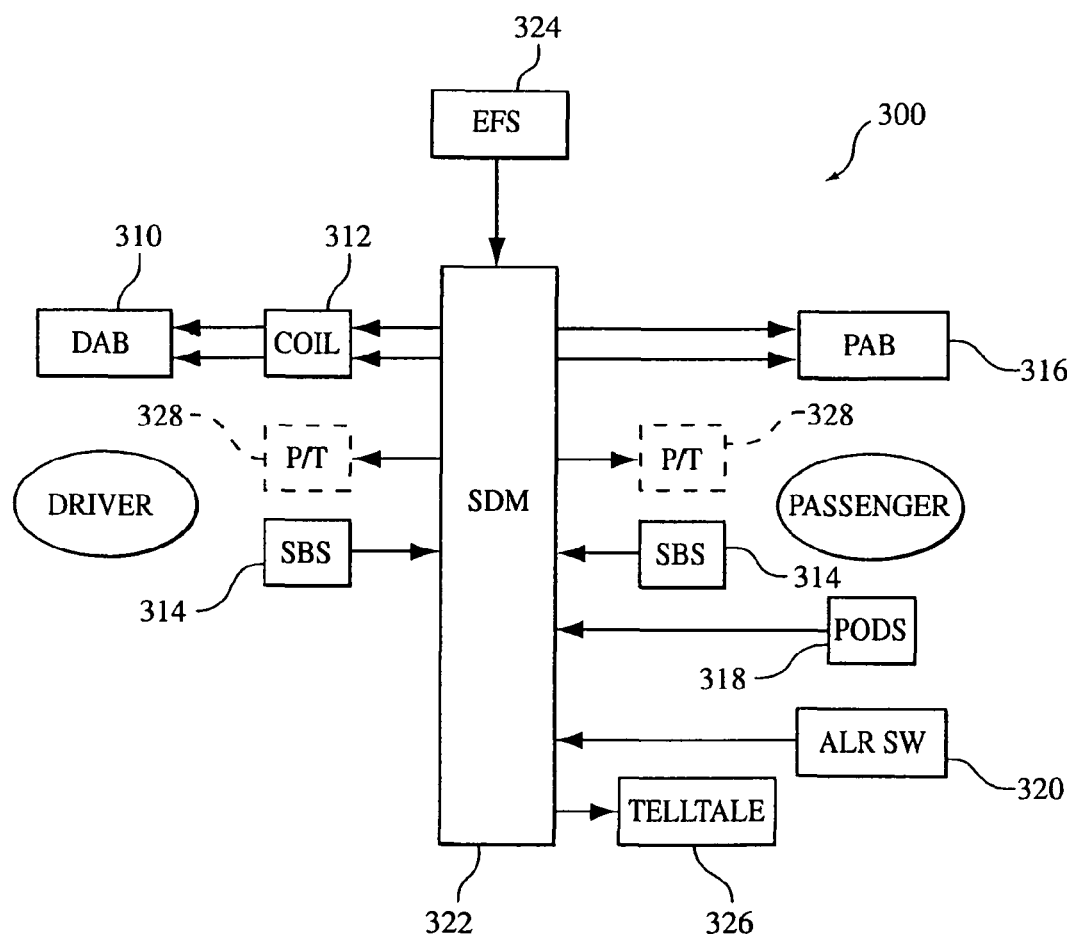
FIG. 10 is a diagrammatic illustration of an occupant protection system.

Referring now to FIG. 10, a vehicle occupant protection system 300 is illustrated. System 300 includes a driver airbag (DAB) 310. In an exemplary embodiment, driver airbag 310 is an air bag module capable of deploying an air bag in a two step manner. This is achieved in one embodiment by adding an inflator with two charges and two initiators and firing the initiators in sequence with a predetermined fixed time delay.

For example, one such driver airbag 310 may be the airbag module described in FIGS. 1-5. A clock spring coil 312 (coil) is configured to transmit a deployment current independently to each initiator of the air bag module from the vehicle electrical system via the SDM into the rotating steering wheel and to the driver airbag module using a continuous coil of wire or similar device.

Seat belt switches (SBS) 314 are located in the seat belt buckles and provide a signal indicating the proper attachment and usage of seat belts. This information is provided to the system control algorithm to tailor system performance for belted and unbelted occupants such as modifying the severity threshold parameters for deployment.

A passenger airbag (PAB) 316 is also incorporated into system 300. In an exemplary embodiment, passenger airbag 316 is an air bag module capable of deploying an airbag in a two step manner. This is achieved in a manner similar to the driver side air bag as well as the modules illustrated in FIGS. 6-9. Also, the passenger airbag may utilize a Biased Deployment Flap as disclosed in commonly owned and assigned U.S. Pat. No. 5,348,343.

Alternatively, passenger airbag 316 is an airbag module wherein the deployment is achieved through the use of alternative charges being fired and/or venting schemes in which the gas produced by the inflator is varied accordingly.

A Passive Occupant Detection system (PODS) 318 includes a seat mounted sensor used to detect the approximate size of the passenger occupant by weight. The sensor is used by the control system to suppress the passenger airbag in accordance with pre-determined criteria.

An automatic locking retractor switch (ALR SW) 320 is used with a combination ELR/ALR seat belt system. The combination ELR/ALR seat belt system normally operates in the emergency locking retractor (ELR) mode. When the belt is fully extended or above a pre-determined length, the belt system switches to an automatic locking retractor mode for use in securing certain infant and child seats. The ALR switch detects when the seat belt is in the ALR mode and provides this information to the control system. The control system uses this information in conjunction with the PODS data to determine if a child or infant seat is present in the passenger seat; and the control system will suppresses the airbag, if appropriate.

One contemplated automatic locking retractor switch is of the type described and disclosed in commonly owned and assigned U.S. provisional patent application Ser. No. 60/247,309 filed on Nov. 9, 2000.

Another type of seat belt tension sensing device for determining whether an infant or child seat is secured by the seat belt and for providing a signal to the sensing and diagnostic module is of the type described and disclosed in commonly owned and assigned U.S. patent application Ser. No. 09/796,237, filed Feb. 28, 2001. (FIGS. 12-20).

Other contemplated types of seat belt tension sensing devices are described and disclosed in commonly owned and assigned U.S. patent application Ser. No. 09/415,533, filed Oct. 8, 1999 and Ser. No. 09/482,298 filed Jan. 1, 2000.

A sensing and diagnostic module (SDM) 322 is an electronic control module that senses and diagnoses signals from sensors and determines if the air bags, pre-tensioners, etc. should be deployed. The SDM uses inputs from both internal and external sensors to determine if air bag and/or pre-tensioner suppression is required.

Figure 11:
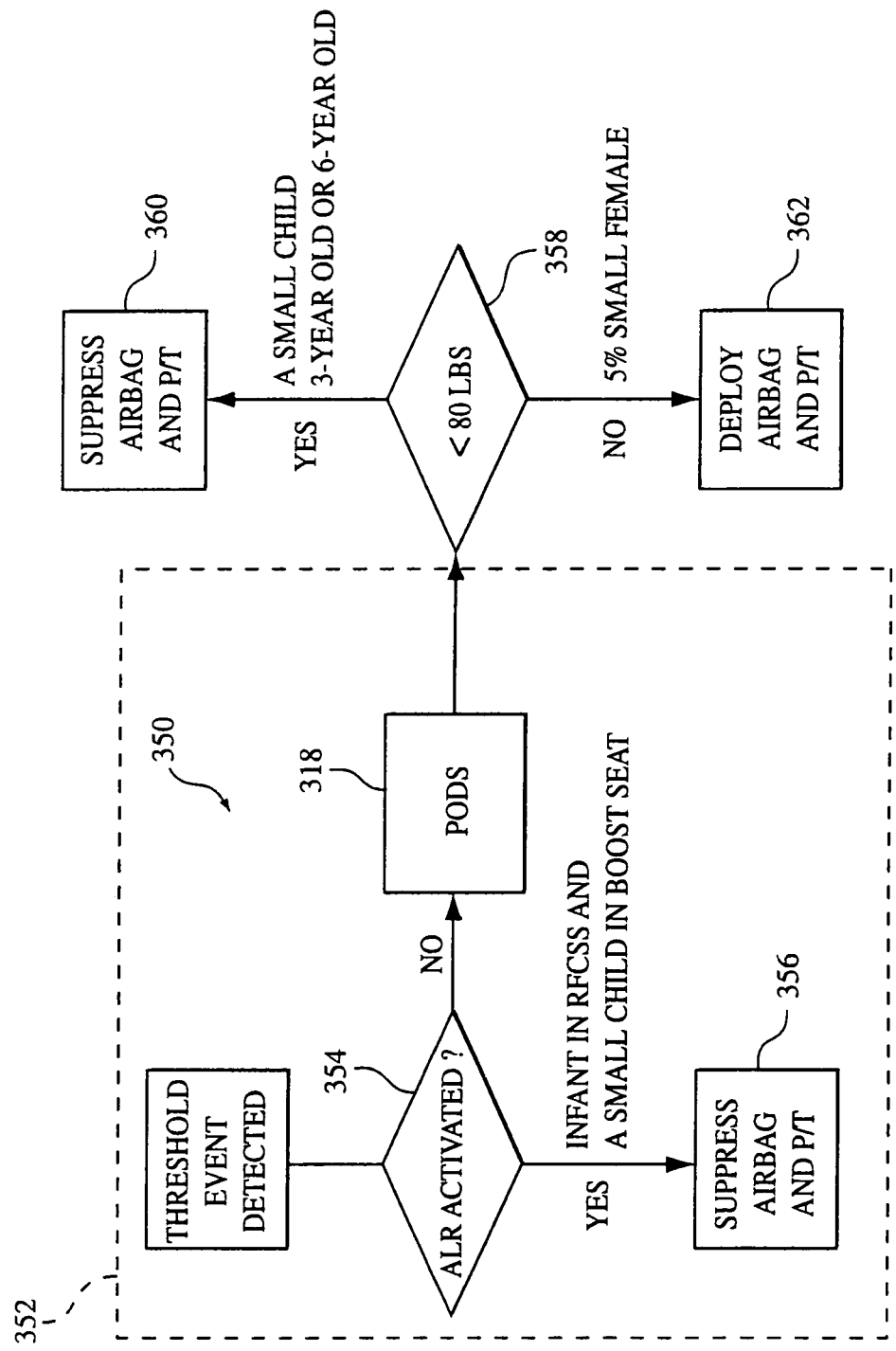
FIG. 11 is a flowchart illustrating portions of a command sequence employed by the FIG. 10 embodiment.

In an exemplary embodiment, the SDM follows the logic shown in FIG. 11, which illustrates portions of a command sequence of the control algorithm of the SDM. Of course, and as applications require, other control algorithms and/or sequences may be employed with the present invention.

The SDM also contains its own internal sensors for measuring vehicle decelerations for arming and discriminating purposes. In addition, an external electronic frontal sensor 324 is positioned typically at the front of the vehicle to provide early detection of various impacts. The electronic frontal sensor (EFS) is an external sensor mounted in the engine compartment typically mounted on the radiator tie bar to supplement the internal sensors of the SDM in detecting and responding in a timely manner to threshold impacts such as the offset deformable barrier impact.

In addition, system 300 includes a telltale light 326. Telltale light 326 is a light mounted in the passenger compartment positioned to indicate the status of passenger airbag deployment activation. When the passenger side air bag is suppressed, the telltale light will be turned on indicating the passenger airbag is suppressed.

As an alternative, seat belt pre-tensioners (P/T) 328 are included into system 300. Seat belt pre-tensioners 328 are pyrotechnic devices that remove slack from the seat belt.

Referring now to FIG. 11, a flowchart 350 illustrates portions of a control algorithm wherein the passenger air bag deployment and other safety restraints are partitioned into a two-step process. A first step 352 is illustrated by the dashed lines in FIG. 11 here first step 352 determines whether airbag suppression is necessary while also determining whether an infant car seat is present. A decision node 354 determines whether the automatic locking retractor switch 320 has been activated or a seat belt cinching sensor detected enough tension of the seat belt webbing. If so, a command step 356 instructs the SDM to suppress the passenger side air bag. If on the other hand, the ALR has not been activated, the PODS 318 determines whether an occupant smaller than a pre-determined size and weight is present in the passenger seat. One example of a predetermined size and weight is that of a six-year-old test dummy or substantial equivalent thereof. Of course, other pre-determined sizes and weights may be used with the PODS system. This is performed through the use of a passenger seat sensor or other sensing means.

A decision node 358 determines whether the occupant in the passenger seat is less than a prescribed weight. For example, FIG. 11 illustrates a decision node with an 80 pound prescribed weight. Of course, and as applications may require this value can vary.

If decision node 358 determines that the occupant is less than the prescribed weight a command step 360 will instruct the control module to suppress the passenger side air bag. In addition, and in applications where the alternative seat belt pre-tensioners (P/T) 328 have been included these will also be suppressed by command step 360.

If on the other hand, decision node 358 determines that the occupant is not less than the prescribed weight a command step 362 instructs the control module to deploy the passenger side air bag as well as seat belt pre-tensioners (P/T) 328 if, of course, the same are included in the system.

Figure 12:
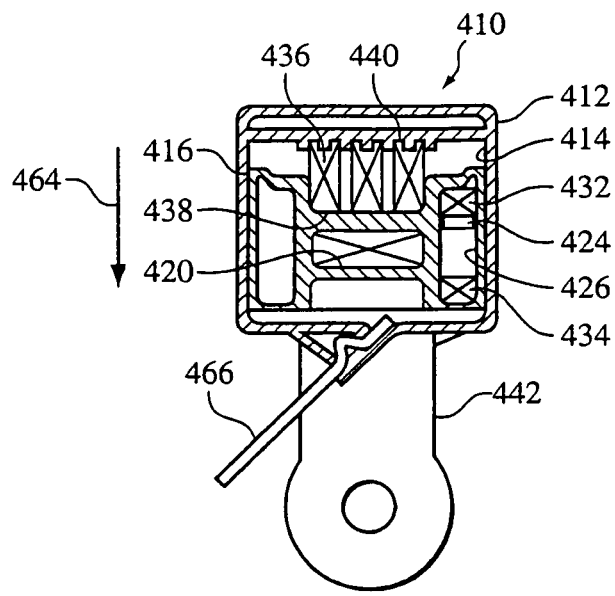
FIG. 12 is a cross sectional view of a seat belt tension assembly without tension.
Figure 13:
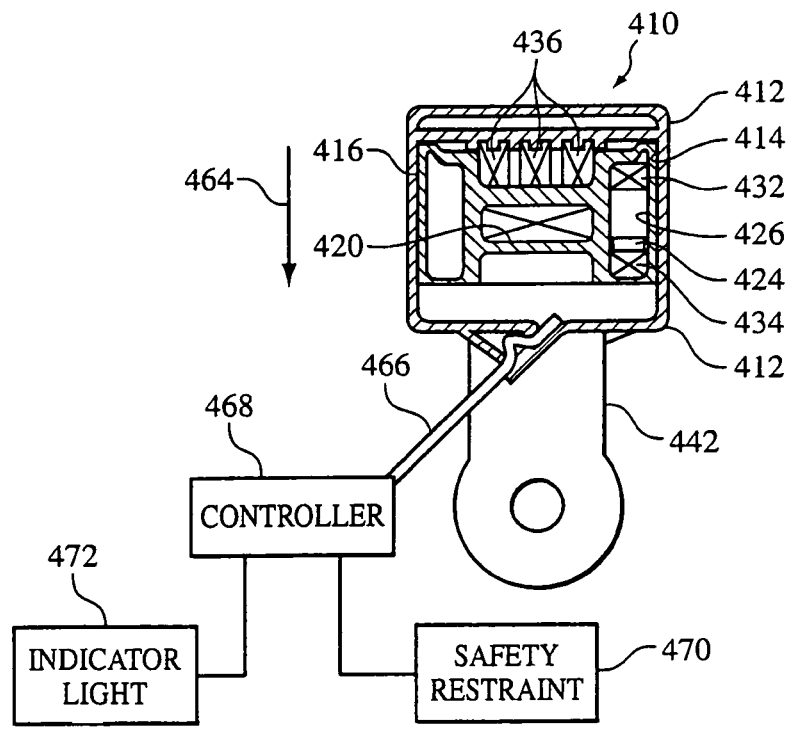
FIG. 13 is a cross sectional view of the seat belt tension assembly of FIG. 12 under tension.
Figure 17:
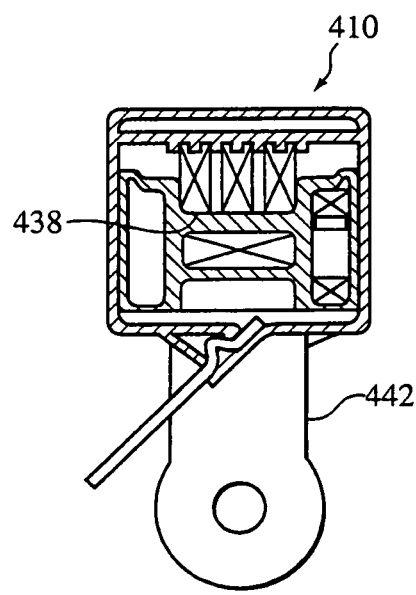

Referring now to FIGS. 12-13 and 17, an embodiment of a seat belt tension sensor is shown generally at 410. Seat belt tension sensor 410 includes an analog sensor design, which will produce a signal relative to the variation in the tension of the seat belt. Seat belt tension sensor 410 has a housing portion 412. Housing portion 412 is preferably constructed out of a lightweight, easily-molded material such as plastic. Housing 412 has a central receiving area 414. A slider 416 is configured to be slidably received within central receiving area 414.

The dimensions of slider 416 are such that the same is capable of movement in a range defined by a first position (FIG. 12) and a second position (FIG. 13). The first position corresponds to little or no tension, and the second position corresponds to a tension greater than or equal to a pre-determined tension. The predetermined tension relates to a tension value that will determine whether or not a child seat is cinched by the seat belt.

Housing 412 has an opening 418. In addition, slider 416 has an opening 420. Opening 418 is larger than opening 420, allowing opening 420 to traverse within opening 418 as slider moves within the range defined by the first position and the second position. In addition, slider 416 has a pair of tab portions 422 which protrude outwardly from the surface of slider 416 proximate to opening 420.

Figure 19:
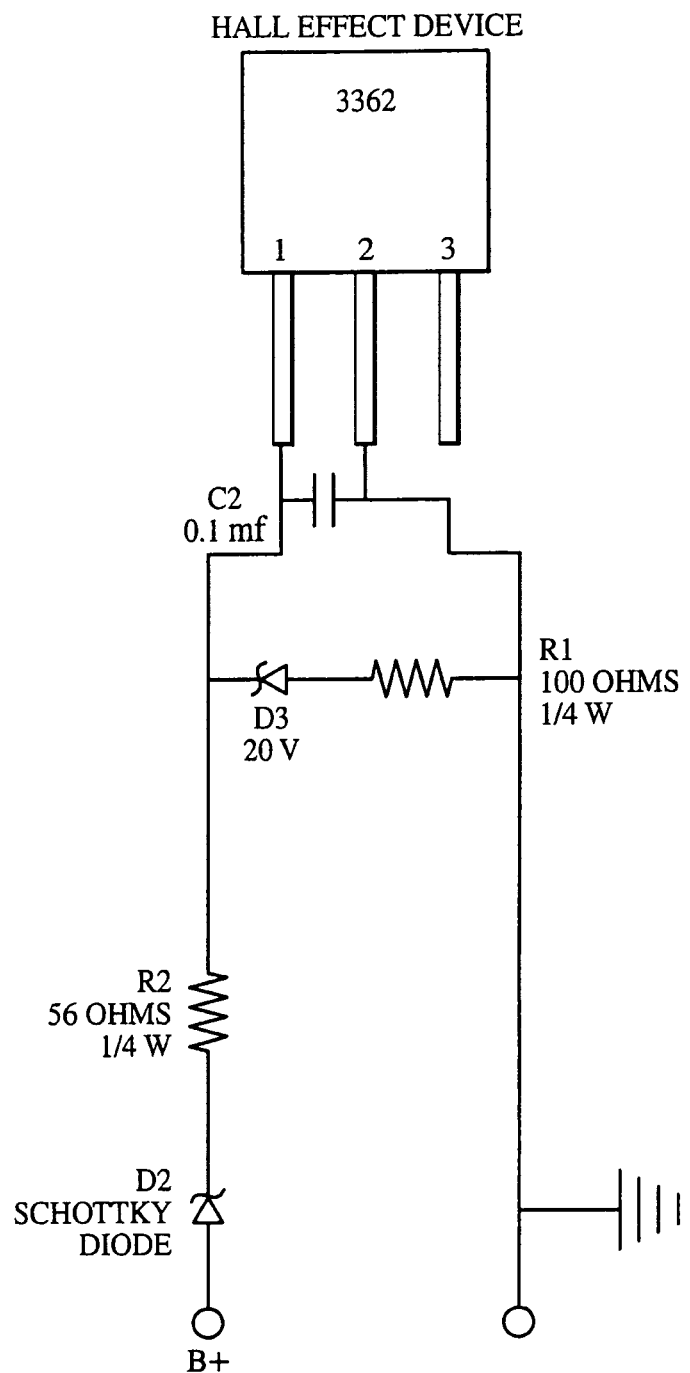
FIGS. 19-20 are schematics of Hall effect devices for use with the present invention.
Figure 20:
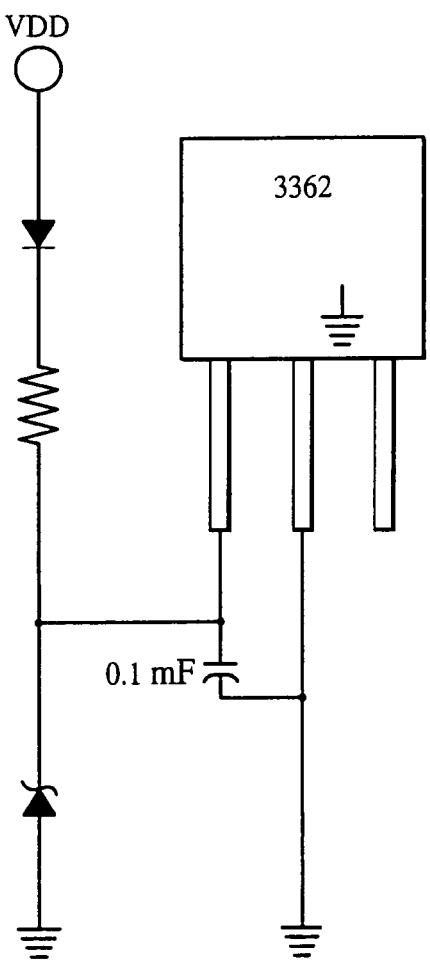

A sensor 424 is also positioned within receiving area 414. In an exemplary embodiment, sensor 424 is a Hall effect sensor assembly (examples of which are illustrated in FIGS. 19 and 20). Hall effect sensor assembly 424 includes a Hall effect device and complimentary circuit board. An opening 426 is disposed on slider 416. Opening 426 is substantially large enough to allow slider 416 to move within the range defined by the first position and the second position, while Hall effect sensor assembly 424 remains stationary. In addition, slider 416 is configured to have a shoulder portion 428. Shoulder portion 428 is configured to accommodate a baseplate 430 to which Hall effect sensor 424 and related electrical components are secured. As illustrated in FIGS. 12-13 and 17, Hall effect sensor 424 depends outwardly from baseplate 430. Accordingly, the securement of Hall effect sensor 424 within receiving area 414 will not impede the travel of slider 416.

A pair of magnets 432 and 434 are positioned at either end of opening 426. Accordingly, and as slider moves in the range defined by the first position (FIG. 12) and the second position (FIG. 13), hall effect sensor 424 moves away from magnet 432 and travels toward magnet 434.

The Hall effect device will sense the strength of the magnetic field of the approaching magnet (either magnet 432 or magnet 434, depending on the direction of travel), and depending on the strength of the magnetic field, the Hall effect device will generate an electric signal to determine the level of the tension force, the electric signal being received by a system controller to determine whether or not to suppress any safety-related items such as a hypertensioner, airbag, or pre-tensioner, etc. When the tension force exceeds the pre determined threshold, the system will suppress a passenger air bag. The analog design will provide a liner output, corresponding to seat belt tension, to the controller.

In an exemplary embodiment, the Vcc (supply voltage) of the Hall effect sensor assembly 424 is 5 volts+/−0.5 volts DC. The voltage with no magnetic field present will be approximately 2.5v. As the magnet is brought into the proximity of the sensor, the voltage will increase to near Vcc or decrease to near ground, depending on the polarity of the magnet. Accordingly, as the voltage increases or decreases, so does the tension of the seat belt. Of course, Vcc may have values greater than and less than 5 volts.

A biasing force for urging slider 416 in the direction of the first position (FIG. 12) is provided by a plurality of springs 436. Plurality of springs 436 are configured to be received within a plurality of spring apertures 438 in slider 416 at one end, and make contact with a wall 440 of receiving area 414. In an exemplary embodiment, three springs are used, and as applications may require, the number, size, and configuration of springs 436 may vary.

Once the internal components of sensor 410 are assembled, an anchor plate 442 is secured to housing 412. In an exemplary embodiment, anchor plate 442 is manufactured out of a durable material such as steel. Anchor plate 442 has an opening 444 which aligns with opening 418 of housing 412 when anchor plate 442 is secured to housing 412. Opening 444 is substantially similar to opening 418 of housing 412, thus allowing the travel of opening 420 within openings 444 and 418.

Anchor plate 442 has a securement end 446 which is configured to engage a shoulder portion 448 of housing 412. In addition, housing 412 has a securement opening 450, positioned to engage a securement tab 452 of anchor plate 442. The securement tab 452 includes a chamfered engagement surface 454 and an engagement surface 456. Securement tab 452 has resilient qualities which allow it to have a snap fit engagement of anchor plate 442 to housing 412. Accordingly, seat belt tension sensor 410 is easily assembled by snapping anchor portion 442 to housing 412. Accordingly, there are no additional manufacturing steps.

Anchor plate 442 has a securement portion 458 which depends away from housing 412 when anchor plate 442 is secured to the same. Securement portion 458 has an opening 460 which allows a securement bolt to pass therethrough in order to secure sensor assembly 410 to a vehicle.

Referring now to FIGS. 12-13 and 17, and as sensor assembly 410 is fixedly secured to a vehicle, a portion of a seat belt 462 passes through openings 418, 420, and 444, Referring now to FIGS. 12 and 13, a plurality of springs 436 provide an urging force in the direction of arrow 464 to maintain slider in the position illustrated in FIG. 12. In an exemplary embodiment, the biasing force of springs 436 is overcome when a force in the amount of 5 to 15 lbs is applied in the direction substantially opposite of arrow 464. Of course, and as applications may require, the biasing force of springs 436 to be overcome may vary. For example the biasing force of springs 436 may be greater or less than 15 lbs, this can be varied to comply with a manufacturing request for a different biasing force, Accordingly, and when the urging force of springs 436 is overcome, slider 416 travels towards the position illustrated in FIG. 13. In so doing, magnet 432 is moved away from the Hall effect sensor and magnet 434 is moved closer to the Hall effect sensor, causing a resulting signal to be sent through one of a plurality of wires 466 secured to Hall effect sensor 424.

The signal is ultimately received by a microcontroller 468 which controls the operation of an occupant protection system(s) 470 such as an airbag or other safety restraint system. The microcontroller will suppress the air bag and provide a signal to an indicator light 472 to indicate that the air bag has been suppressed. Indicator light 472 is located in a position within the vehicle compartment that is easily viewed by the operator and/or occupants of the same. For example, one such location of indicator light 472 is on the vehicle dashboard. In addition, the microcontroller may also provide an audible tone or voice response, indicating that the air bag has been suppressed.

Figure 16:
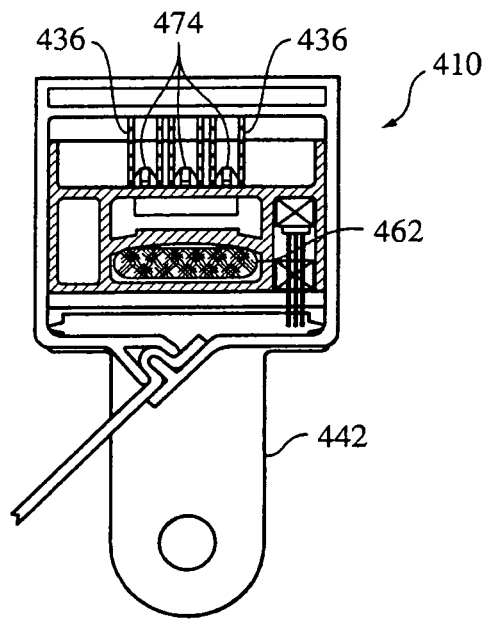
FIGS. 16 and 17 are cross sectional views of alternative seat belt tension assemblies.

Referring now to FIGS. 14-16, alternative design configurations of sensor 410 are illustrated. In FIG. 16, a plurality of protrusions 474 are positioned to receive one end of springs 436. In addition, securement portion 458 of anchor plate 442 can be configured to have an angular displacement with respect to anchor plate 442 (FIG. 15). Alternatively, securement portion 458 of anchor plate 442 depends outwardly from the same.

Figure 18:
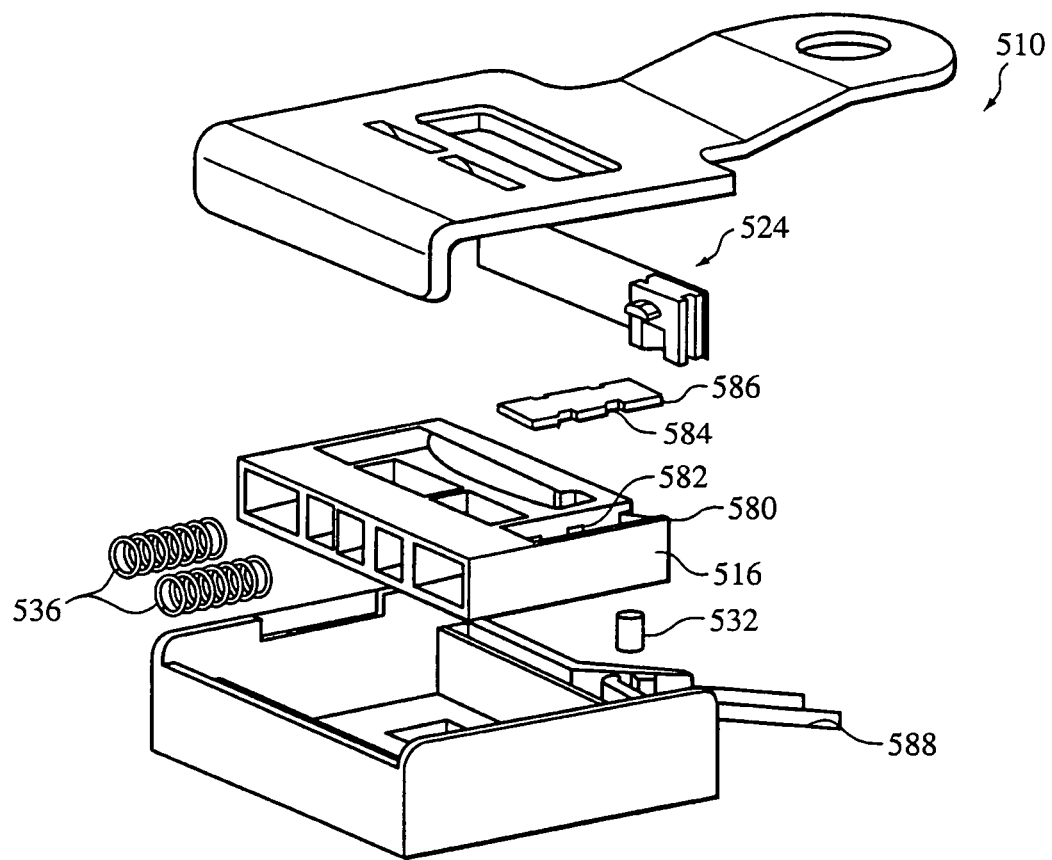
FIG. 18 is an exploded view of an alternative embodiment of the present invention.

Referring now to FIG. 18, an alternative embodiment of the present invention is illustrated. Here, component parts performing similar or analogous functions are labeled in multiples of 500. Here, seat belt tension sensor 510 is a digital sensor design. This design is configured to provide an On-Off signal to the controller in order to suppress the safety device.

Here, slider 516 is configured to have a receiving area 580 having a plurality of tabs 582 for engaging notches 584 in a shutter 586. Shutter 586 is a planar member constructed out of a metal capable of shunting the magnetic field generated by a magnet 532.

In this embodiment, a single magnet 532 is positioned to be sensed by a Hall effect sensor assembly 524. Accordingly, and as slider 516 is urged by the tension of the seat belt passing through seat belt tension sensor 510, shutter 586 is moved away from its shunting position in between the hall effect sensor and the magnet. A biasing force for urging slider 516 in the direction of the first position is provided by a plurality of springs 536. The movement of shutter 586 away from magnet 532 is detected by Hall effect sensor assembly 524 and a signal is sent out to a microcontroller via wires 588.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A restraint system for a vehicle, comprising:
    an airbag module having an inflator with a pair of initiators;
        an airbag module controller for providing a sequential firing of both said pair of initiators such that there will be no unfired initiator left in said airbag module;
        a plurality of sensors for providing input signals to said airbag module controller, said airbag module controller providing activation signals to said pair of initiators; and an airbag module suppression system, said airbag module suppression system instructs said airbag module controller to suppress said airbag module;
wherein said airbag module controller is a sensing and diagnostic module, said sensing and diagnostic module generating a first signal and a second signal, said first signal activating one of said pair of initiators and said second signal activating the other one of said pair of initiators, said second signal being delayed a pre-determined time after said first signal; and
wherein said airbag module suppression system is a passive occupant detection system comprising a means for detecting a vehicle occupant, said passive occupant detection system instructs said airbag module controller to suppress said airbag module when a predetermined condition has been met;
wherein said sensing and diagnostic module receives a third signal indicative of the proper attachment and usage of a seatbelt, a fourth signal indicative of the approximate size by weight of the vehicle occupant, a fifth signal indicative of whether a seatbelt is fully extended or extended above a predetermined length and a sixth signal indicative of a threshold impact.

2. The restraint system as set forth in claim 1 wherein the air bag module includes a passenger air bag and the sensing and diagnostic module includes control logic wherein upon the detection of a threshold event a determination is made as to whether a seatbelt is extended above a predetermined length;
when the seatbelt is extended above the predetermined length, deployment of the passenger airbag is suppressed;
when the seatbelt is not extended above the predetermined length, a determination is made as to whether an occupant, less than a predetermined weight, is present in a passenger seat;
when an occupant, less the predetermined weight, is present in the passenger seat, deployment of the passenger airbag is suppressed;
when an occupant, not less than the predetermined weight, is present in the passenger seat, the passenger airbag is deployed.

3. The restraint system as in claim 1, wherein said predetermined time ranges from about 5 milliseconds to about 35 milliseconds.

4. The vehicle restraint system as in claim 1, further comprising:
seatbelt switches for providing a signal to said sensing and diagnostic module, said signal indicating whether a seatbelt is properly fastened.

5. The restraint system as in claim 1, further comprising:
an indicator means for indicating when said passenger side airbag module is suppressed.

6. The restraint system as in claim 1, further comprising:
a seat mounted sensor for detecting a vehicle occupant by weight, said seat mounted sensor provides a first suppression signal to said sensing and diagnostic module to suppress a passenger side airbag module when the weight of same vehicle occupant is below a pre-determined weight; and
a seatbelt sensor for determining whether an infant seat is secured to a passenger seat via a seatbelt, said seatbelt sensor provides a second suppression signal to said sensing and diagnostic module to suppress said passenger side airbag module when said infant seat is fastened to said passenger seat.

7. The vehicle restraint system as in claim 6, further comprising an indicator means for indicating when said airbag module is suppressed.

8. The vehicle restraint system as in claim 7, wherein said indicator means is an indicator light.

9. The vehicle restraint system as in claim 6, further comprising a pre-tensioner disposed on said seatbelt, said pre-tensioner being adapted to remove slack from said seatbelt in response to pre-determined conditions sensed by said plurality of sensors, said sensing and diagnostic module being configured to suppress said pre-tensioner in response to either said first suppression signal or said second suppression signal.

10. The vehicle restraint system as in claim 6, wherein said seatbelt sensor is an automatic locking retractor switch or a belt tension sensor.

11. The vehicle restraint system as in claim 2 further comprising a passenger side airbag module having an inflator with a first initiator and a second initiator.

12. The vehicle restraint system as in claim 11, wherein said sensing and diagnostic module employs all received signals to provide for a sequential firing of said first and second initiators such that there will be no unfired initiator left in said passenger airbag module, said first initiator configured to cause said inflatable airbag to break through or open an airbag cover when said first initiator is ignited, and said second initiator configured to inflate said airbag to fully inflate said airbag.

13. The vehicle restraint system as in claim 12, wherein said second initiator is ignited a fixed period of time after said first initiator is ignited.

14. The vehicle restraint system as in claim 13, wherein said inflator produces combustion products which result in said airbag inflating with a first inflating force sufficient to cause said inflatable airbag to break through or open an airbag cover when said first initiator is ignited, and said inflator produces combustion products which result in said airbag inflating with a second inflating force sufficient to deploy said inflatable airbag to a desired deployment configuration when said second initiator is ignited.

* * * * *